US008724896B2

(12) United States Patent
Atkins (10) Patent No.: US 8,724,896 B2
(45) Date of Patent: May 13, 2014

(54) METHOD AND SYSTEM FOR COLOR-GRADING MULTI-VIEW CONTENT (75) Inventor: Robin Atkins, Campbell, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 59 days.

(21) Appl. No.: 13/597,028

(22) Filed: Aug. 28, 2012

(65) Prior Publication Data
US 2013/0051666 A1    Feb. 28, 2013

Related U.S. Application Data (60) Provisional application No. 61/529,168, filed on Aug. 30, 2011.

(51) Int. Cl.
*G06K 9/00* (2006.01)
*H04N 13/00* (2006.01)
*H04N 13/04* (2006.01)

(52) U.S. Cl.
CPC ....... *H04N 13/0037* (2013.01); *H04N 13/0025* (2013.01); *H04N 13/0022* (2013.01); *H04N 13/0422* (2013.01)
USPC .......................................... 382/167; 382/168

(58) Field of Classification Search
None
See application file for complete search history.

(56) References Cited

U.S. PATENT DOCUMENTS

| 6,111,596 A | 8/2000 | Haskell |
| 2008/0112616 A1 | 5/2008 | Koo |
| 2009/0052776 A1 | 2/2009 | Panahpour Tehrani |
| 2010/0066811 A1 | 3/2010 | Chang |
| 2011/0037829 A1 | 2/2011 | Hata |
| 2011/0316849 A1* | 12/2011 | Shindo et al. ................. 345/419 |
| 2012/0062580 A1* | 3/2012 | Shimada et al. .............. 345/589 |
| 2012/0105595 A1* | 5/2012 | Li ................................... 348/49 |
| 2012/0133733 A1* | 5/2012 | Sakaniwa et al. ............. 348/43 |
| 2013/0004059 A1* | 1/2013 | Said ............................... 382/154 |

FOREIGN PATENT DOCUMENTS

| EP | 2259599 | 12/2010 |
| WO | 2006062325 | 6/2006 |
| WO | 2012/125892 | 9/2012 |

OTHER PUBLICATIONS

Fecker, Ulrich, Marcus Barkowsky, and André Kaup. "Time-constant histogram matching for colour compensation of multi-view video sequences." Proc. 26th Picture Coding Symp.(PCS 2007). 2007.*
Smolic, Aljoscha, et al. "Three-dimensional video postproduction and processing." Proceedings of the IEEE 99.4 (2011): 607-625.*
Pitié, François, Anil C. Kokaram, and Rozenn Dahyot. "Automated colour grading using colour distribution transfer." Computer Vision and Image Understanding 107.1 (2007): 123-137.*
Lou Jian-Guang, Hua Cai, and Jiang Li. "A real-time interactive multi-view video system." Proceedings of the 13th annual ACM international conference on Multimedia. ACM, 2005.*

(Continued)

*Primary Examiner* — Li Liu (57) ABSTRACT

Methods and apparatus for color grading stereoscopic and autostereoscopic (multi-view) view video content are provided. Video content for one view is adjusted so that a histogram of the adjusted video data is more similar to a target histogram than the original, unadjusted video content for the one view. The adjusted video content is automatically color graded based on a color grading of video content for another view. The target histogram may be calculated for the video content for the other view.

42 Claims, 8 Drawing Sheets

(56) References Cited

OTHER PUBLICATIONS

Chen, Yibin et. al., "Histogram-Offset-Based Color Correction for Mutli-view Video Coding", Proceedings of 2010 IEEE 17th International Conference on Image Processing, Sep. 26-29, 2010, Hong Kong.

Ionita, M.C. et al. "Benefits of Using Decorrelated Color Information for Face Segmentation/Tracking Advances" Optical Technologies, vol. 2008, 8 pages.

Kouassi, R.K. et al. "Application of the Karhunen-Loeve Transform for Natural Color Images Analysis" in Proc. of the 31st Asilomar Conference on Signals, Systems & Computers (ACSSC 1997) vol. 2, pp. 1740-1744, Pacific Grove, California, USA.

Pouli, T. et al. "Progressive Histogram Reshaping for Creative Color Transfer and Tone Reproduction" Proc. of NPAR 2010 Proceedings of the 8th International Symposium on Non-Photorealistic Animation and Rendering, 2010, pp. 81-90.

Ruderman, D. L. et al. "Statistics of Cone Responses to Natural Images: Implications for Visual Coding" Journal of the Optical Society of America A, vol. 15, No. 8, pp. 2036-2045, Aug. 1998.

* cited by examiner

METHOD AND SYSTEM FOR COLOR-GRADING MULTI-VIEW CONTENT

CROSS-REFERENCE TO RELATED APPLICATIONS

This application claims priority to U.S. Provisional Application No. 61/529,168 filed 30 Aug. 2011, hereby incorporated by reference in its entirety.

TECHNICAL FIELD OF THE INVENTION

The invention relates to color grading multi-view content, such as paired stereoscopic video streams. Embodiments may provide color graded multi-view content with improved color consistency among content for different views.

BACKGROUND OF THE INVENTION

The creator of a video production or other image may set tones and colors of pixels in the image so that, when viewed, the image has a desired appearance which agrees with the creator's creative intent. For example, a creator may wish some scenes to have a darker, more oppressive, feel than others. The creator may wish certain features depicted in a scene to stand out or to be less prominent. The creator may wish to have colors seem extra vivid in some scenes and more muted in others. Adjusting tones and colors of pixels in an image may include performing color grading (or 'color timing') on the source video data. Color grading may be performed using a hardware/software system (sometimes referred to as a color grading station) that permits a user to change the video data in various ways to achieve a desired appearance. Color grading may involve manual user input (e.g., in the case of pre-recorded films or television programs) or be performed automatically according to pre-determined parameters (e.g., in the case of live broadcasts).

Some displays have a three dimensional (3D) display mode in which the display is operable to display 3D image data. In 3D display mode, a 3D visual effect may be generated by operating the display to deliver a different image to each eye of the viewer. The left and right eye images represent different perspectives of the same scene or object. The viewer's brain combines and interprets the left and right eye images to perceive a single 3D image having the illusion of depth. Such displays may be referred to as stereoscopic 3D displays. 3D image data, such as stereoscopic 3D video streams, for example, provided for display on such displays may be referred to as stereoscopic 3D content.

Various display technologies exist for delivering different images to the left and right eyes of the viewer. For example, in active 3D viewing technologies, the viewer may wear eyeglasses including optical shutters that are operated in synchronization with the display to allow only one eye to view the display at a time. The display is operated to show an image for viewing by the viewer's left eye while the left eye shutter is opened and the right eye shutter is closed. Then the left eye shutter is closed and the right eye shutter is opened while the display is operated to display an image for viewing by the viewer's right eye. The switches occur quickly enough that they are not perceptible to the viewer.

In other technologies, such as passive viewing technologies, the viewer may wear spectral filtration eyeglasses to view different left and right eye images. The display is operated to provide spectrally filtered light to the viewer so that the left eye is presented with light in a first set of spectral bands (providing a left eye image) and the right eye is presented with light in a complementary, second set of spectral bands (providing a right eye image).

In other passive viewing technologies, the viewer may wear polarized eyeglasses having polarizing filters (e.g. linearly polarized eyeglasses or circularly polarized eyeglasses). Images for viewing by the viewer's left and right eyes are each polarized so that they can be seen by the intended eye but not the other eye when wearing the polarized eyeglasses.

In addition to the above-noted technologies, other technologies exist for delivering different images to each eye to provide a 3D viewing experience. A non-limiting example of such a technology is autosteroscopic (or multi-view) displays.

Stereoscopic 3D content is often generated from paired content captured by distinct cameras having different viewpoints (e.g., left and right). Because grading multiple video streams is time consuming, expensive and/or fatiguing for a colorist (especially if done simultaneously), color grading of stereoscopic 3D video content is typically performed for only one video stream (the reference view video stream) and the same color grading operations applied to the other stream. Where there exist differences in exposure between the reference view stream and non-reference view stream, or of settings, lenses, and/or position of the cameras used to acquire the streams, this technique may result in mismatches between color and/or luminance characteristics among the streams. This may cause fatigue or eye strain to some viewers, and may result in a degraded image quality to others.

There is a need for methods and apparatus that provide efficient color grading of stereoscopic 3D content. There is need for methods and apparatus that provide color graded stereoscopic 3D content with improved color and/or luminance consistency among content for different views.

Literature in the general field of the invention includes:
US2011/0037829;
U.S. Pat. No. 6,111,596; and
Yibin Chen, Kai-Kuang Ma and Canhui Cai, Histogram-offset-based color correction for multi-view video coding, Proceedings of 2010 IEEE 17th International Conference on Image Processing, Hong Kong, Sep. 26-29, 2010.

The foregoing examples of the related art and limitations related thereto are intended to be illustrative and not exclusive. Other limitations of the related art will become apparent to those of skill in the art upon a reading of the specification and a study of the drawings.

SUMMARY OF THE INVENTION

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

An aspect of the invention provides a method for color grading second view video content based on a color grading of first view video content. The method comprises obtaining target histogram data, obtaining second histogram data for the second view video content, adjusting the second view video content so that a histogram of the adjusted second view video content is more closely similar to the target histogram data, and automatically color grading the adjusted second view video content based on a color grading of the first view video content. The target histogram data may histogram data for the first view video content, for example. Some embodiments comprise generating a first mapping from the second view video content to the adjusted second view video content by performing a first number of iterations of a progressive histogram reshaping algorithm configured to progressively match histogram data for the second view video content to the target histogram data, and applying the first mapping to generate the adjusted second view video content from the second view video content. Automatically color grading the adjusted second view video content may comprise applying a plurality of color grading operations based on a corresponding plurality of color grading operations applied in the color grading of the first view video content, for example.

Another aspect of the invention provides apparatus for color grading second view video content based on a color grading of first view video content. The apparatus comprises a histogram calculator configured to obtain second histogram data for the second view video content, a video content adjustment engine configured to adjust the second view video content so that a histogram of the adjusted second view video content is more closely similar to the target histogram data, and a color grading station configured to automatically color grade the adjusted second view video content based on a color grading of the first view video content. The target histogram data may comprise histogram data for the first view video content, for example. In some embodiments the video content adjustment engine comprises a progressive histogram matching engine configured to generate a first mapping from the second view video content to the adjusted second view video content by performing a first number of iterations of a progressive histogram reshaping algorithm configured to progressively match histogram data for the second view video content to the target histogram data, and to apply the first mapping to generate the adjusted second view video content from the second view video content. The color grading station may be configured to apply a plurality of color grading operations based on a corresponding plurality of color grading operations applied in the color grading of the first view video content.

A further aspect of the invention provides a method for color grading first view video content and second view video content. The method comprises obtaining target histogram data for the first view video content, obtaining second histogram data for the second view video content, adjusting the second view video content so that a histogram of the adjusted second view video content is more closely similar to the target histogram data, and applying a set of color grading operations to the first view video content and the matched second view video content. In some embodiments, the set of color grading operations is determined without reference to either of the second view video content or the matched second view video content. The set of color grading operations may be determined based at least in part on the first view video content.

In addition to the exemplary aspects and embodiments described above, further aspects and embodiments will become apparent by reference to the drawings and by study of the following detailed descriptions.

BRIEF DESCRIPTION OF DRAWINGS

In drawings that show non-limiting example embodiments.

DESCRIPTION OF THE INVENTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
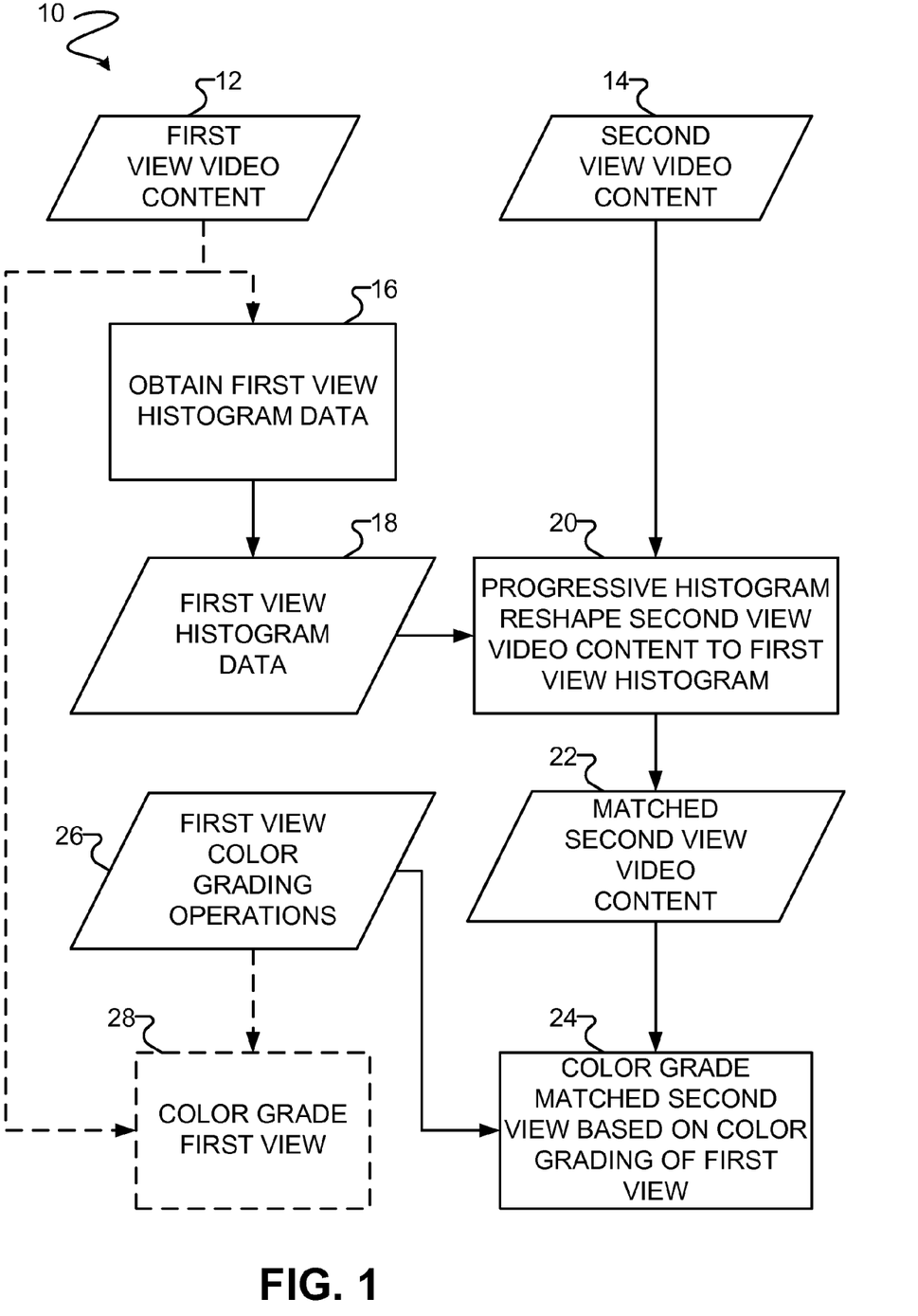
FIG. 1 is a flowchart of a method for color grading multi-view content according to an example embodiment.

FIG. 1 is a flow chart of a method 10 according to an example embodiment. Method 10 produces a color graded version of second view video content 14. In step 16, first view histogram data 18 is obtained for first view video content 12. First view histogram data 18 may be computed from first view video content 12 or obtained from a data store, for example. In an example embodiment, method 10 obtains first view histogram data 18 comprising a set of histograms for each frame of first view video content 12. In another example embodiment, method 10 obtains first view histogram data 18 comprising a set of histograms for a plurality of frames of first view video content 12 belonging to the same scene (e.g., all frames belonging to the scene, a sampling of frames belonging to the scene, etc.).

Histogram data 18 may include histogram data for each color channel of first view video content 12. It will be understood that the term "color channel" as used herein may denote a luminance channel, such as where first view video content 12 is defined in the Yuv color space. The histogram data for each color channel may specify for each of a number of bins how many pixels within the frame or other portion of first content 12 to which the histogram relates have pixel values for the color channel in a range corresponding to the bin. In some embodiments the number of bins is less than the number of possible color channel values. In some embodiments the histogram data is compressed. In some embodiments the number of bins is 250 or fewer. In some embodiments the number of bins is 50 or fewer. It is not mandatory that the histograms for different color channels have the same number of bins. Histograms having different numbers of bins may be used for different color channels.

In some embodiments, step 16 comprises converting first view video content 12 into a suitable colorspace. A range of color spaces may be used. In some embodiments step 16 converts first content 12 into a color space in which different color channels are substantially decorrelated. This is convenient because it reduces image artifacts in the case where each color channel is treated separately as described below. The color space may be a color opponent space.

Non-limiting examples of color spaces that are decorrelated enough for many applications include:

Iαβ (described for example in D. L. Ruderman, et al. Statistics of cone responses to natural images: implications for visual coding, Journal of the Optical Society of America A, vol. 15, no. 8, pp. 2036-2045, 1998);

an image-dependent color space determined, for example, using principal components analysis (PCA) or the Karhunen-Loève transform (KLT) (described for example in R. K. Kouassi et al. Application of the Karhunen-Loeve transform for natural color images analysis, in Proceedings of the 31st Asilomar Conference on Signals, Systems & Computers (ACSSC '97), vol. 2, pp. 1740-1744, Pacific Grove, Calif., USA, November 1997 and Mircea C. Ionita et al., Benefits of Using Decorrelated Color Information for Face Segmentation/Tracking Advances in Optical Technologies Vol. 2008 (2008), Article ID 583687);

O1O2O3;

YdbDr;

YCoCg-R; and

CIELab.

In step 20, second view video content 14 is matched to the first view histogram data 18 using a histogram reshaping technique, which may, for example, comprise a progressive histogram reshaping technique, to yield matched second view video content 22. It will be understood that as used herein the term match and its variants, including the verb matching and the adjective matched, does not necessarily connote equality or sameness, and is intended to be understood in the broader sense of harmony and/or similarity. An example of method of a progressive histogram reshaping technique that may be used in step 20 is described below. For background on progressive histogram reshaping techniques, the reader is referred to Pouli, T. and Reinhard, E. Progressive histogram reshaping for creative color transfer and tone reproduction. In Proceedings of NPAR '10 Proceedings of the 8th International Symposium on Non-Photorealistic Animation and Rendering. 2010, 81-90. In general, there will be fewer differences in color and/or luminance characteristics between matched second view video content 22 and first view video content 12 as compared to between second view video content 14 and first view video content 12.

In step 24 matched second view video content 22 is automatically color graded based on a color grading of first view video content 12. For example, in step 24 one or more color grading operations 26 applied or to be applied to first view video content 12 may be applied to matched second view video content 22. The color grading of first view video content 12 may be performed in step 24, in another step of method 20 (such as optional step 28), or apart from method 20. Color grading operations 26 may be applied to matched second view video content 22 before, simultaneously with, or after their application to first view video content 12. For example, color grading operations 26 may be obtained by creating a record (e.g., a color decision list, or the like) of operations initiated by a user color grading first view content 12 through control of a user interface (e.g., of a color grading system), and then subsequently be applied to matched second view video content 22 as specified by the record.

Because color and/or luminance characteristics of first view video content 12 will generally be closer to those of matched second view video content 22 than to those of second view video content 14, automatic color grading of matched second view video content 22 based on the color grading of first view video content 12 will tend to result in less severe mismatches of color and/or luminance characteristics between color graded first view video content 12 and color graded matched second view video content 22 (e.g., as compared with the mismatches that would result from applying the color grading of first view video content 12 to second view video content 14).

In some embodiments, step 24 comprises determining one or more color grading operations to be applied to first view video content 12 based on automatic and/or manual inspection of first view video content 12, and automatically applying the determined color grading operations to both first view video content 12 and matched second view video content 22. In some embodiments, step 24 comprises obtaining a set of color grading operations corresponding to a color grading applied to first view video content (e.g., in step 24, in another step of method 20 (not shown), or apart from method 20), and applying the obtained set of color grading operations to matched second view content 22. Color grading operations applied in step 24 to matched second view video content 22 may be determined without reference to matched second view video content 22.

Figure 2:
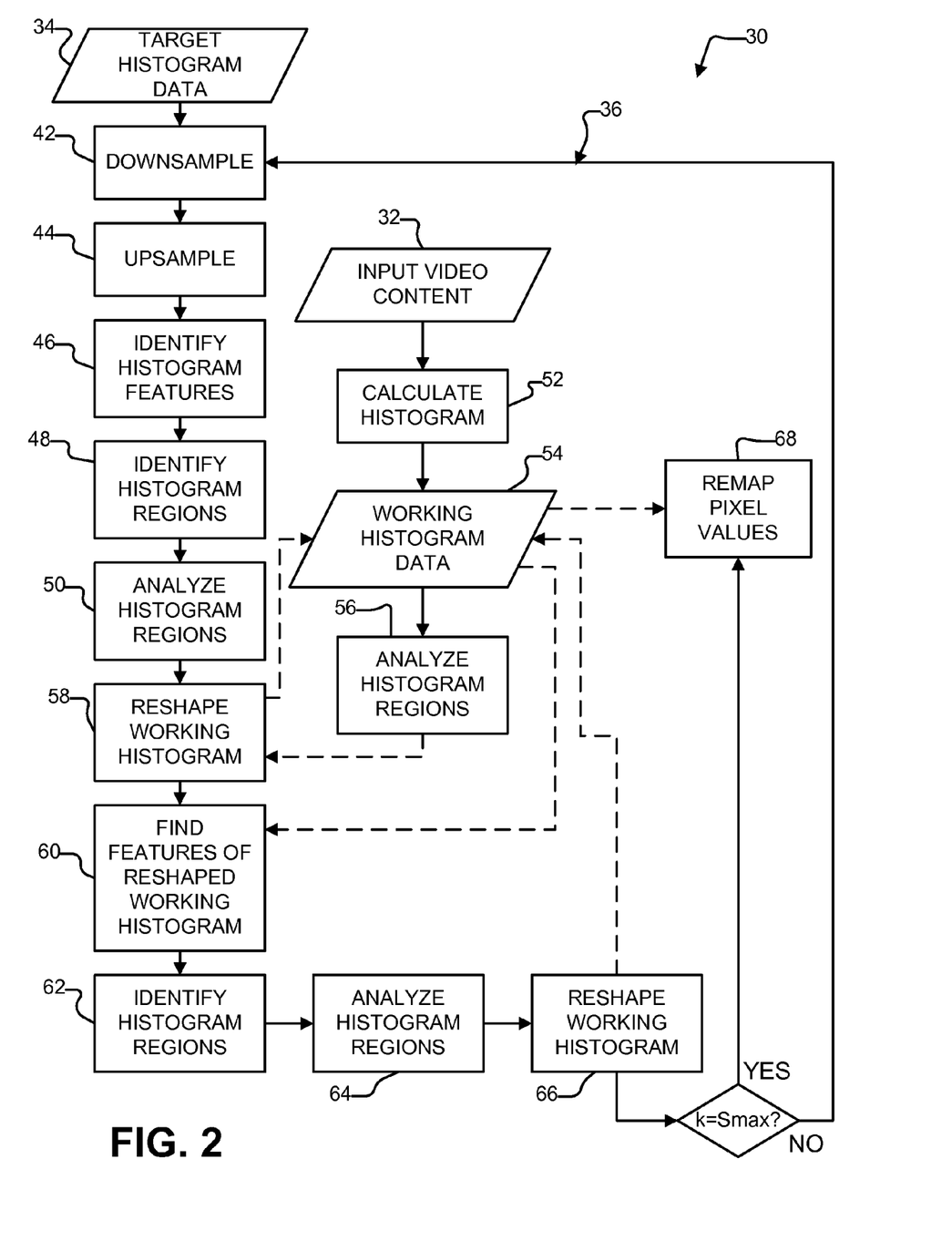
FIG. 2 is a flowchart of an example method of progressive-histogram reshaping, which may be used in some embodiments.

FIG. 2 is flowchart of an example method 30 for progressive histogram reshaping input video content 32 to target histogram data 34. Method 30 may be applied, for example, in step 20 of method 10 (e.g., input video content 32 may comprise second view video content 14 and target histogram data 34 may comprise first view video content histogram data 18). Method 30 may be repeated for each color channel. Method 30 may also be applied in other contexts.

Method 30 includes a loop 36 that is repeated for different histogram scales, beginning with coarser scales and repeating for progressively finer scales. Each scale may be associated with a number of bins into which histogram values are accumulated with coarser scales corresponding to fewer bins (more distinct values associated with each bin, on average), and finer scales corresponding to more bins (fewer distinct values associated with each bin, on average).

In this example embodiment, block 42 downsamples target histogram data 34 for the current color channel. The degree of downsampling (downsampling factor) depends upon the current scale. The scale may be indicated by a scale parameter. Downsampling the histogram data removes high frequency details but preserves gross features of the histogram. Downsampling may comprise bi-cubic interpolation for example.

Block 44 upsamples the downsampled histogram data back to the original size or to another predetermined size. Block 44 is convenient but not mandatory. Where the histogram data is represented at the same resolution for each iteration of loop 36 processing logic can be simplified somewhat.

A wide range of methodologies may be applied to upsample the downsampled histogram data. For example, in an example embodiment upsampling comprises a nearest-neighbor scheme. Applying a nearest-neighbor scheme for upsampling has the advantage of being very simple and producing acceptable results.

Block 46 comprises identifying features in the histogram. Feature identification may comprise, for example, locating zero-crossings of a first order derivative of the histogram. A first order derivative may be obtained by way of forward differencing, for example. The zero crossings may be classified as maxima or minima using a second order derivative of the histogram.

Block 48 identifies regions of the histogram that contain peaks within the histogram based on the features detected in block 46. Each region may, for example, include the bins extending from one minimum of the histogram to a next minimum of the histogram. The last bins selected at either end of a region may be chosen to avoid overlap between adjacent regions.

Block 50 determines statistical properties of each region identified in block 48. Block 50 may comprise, for example, calculating a mean and standard deviation of pixel values for each region.

Block 52 generates working histogram data 54 for input video content 32. Block 56 identifies features of working histogram data 54, identifies regions within working histogram data 54 based on the identified features, and determines statistical properties (e.g. mean and standard deviation) for the identified regions. Block 58 reshapes histogram 54 so that each region of working histogram data 54 has a mean and standard deviation matching that of the corresponding region of target histogram data 34. For example, the reshaping may be performed according to:

where h is a histogram value, σ is a standard deviation for a region, μ is a mean for a region, the subscript A (as in hA, μA and σA) indicates target histogram data 34, the subscript B (as in hB, μB and σB) indicates working histogram data 54 for input video content 32, and wA and wB are weights. Typically the weights are selected such that wA+wB=1.

In some embodiments wA is dependent on the scale. For example, wA may be increased for iterations in which the scale is finer. For example, in some embodiments wA=k/SMAX where k is an index representing the scale (e.g. an iteration number for loop 36) and SMAX is the maximum value for k. SMAX may be preset, chosen to achieve a desired tradeoff between computational burden and closeness of histogram matching, specified by a user, automatically determined based at least in part on an initial comparison of working histogram data 54 and target histogram data 34, or be established in a like manner, for example.

Block 60 determines features (e.g. minima) of the reshaped working histogram data 54. Block 62 identifies regions within the reshaped working histogram data 54. Block 64 determines statistical properties (e.g. means and standard deviations) for the regions between minima of reshaped working histogram data 54. Block 66 reshapes working histogram data 54 in a manner that matches the statistical measures (e.g. means and standard deviations) for the regions of reshaped working histogram data 54 identified in block 62 to those for the corresponding regions of input histogram data 34. In each succeeding iteration of loop 36, the reshaped working histogram data 54 from the previous iteration of loop 36 is used in place of the histogram for input video content 32.

When loop 36 has been performed for a last, finest level of detail (e.g. at the end of the iteration for which k=SMAX) the resulting reshaped working histogram data 54 is passed to block 68 which remaps the pixel values from input video content 32 to modified values based on the reshaped working histogram data 54. This may be done, for example, by performing the calculation:

where VOUT is the pixel color value for the current channel for the pixel at location (x,y) in the matched version of input video content 32, CA is the cumulative histogram computed from target histogram data 34, COUT-1 is the inverse cumulative histogram for the reshaped histogram of input video content 32, vo (i) is the value corresponding to the ith histogram bin of the reshaped second version, min (V) is the minimum for the pixel color value, and R is the width of bins in the histograms. The cumulative histogram C essentially maps a bin index to a cumulative count. The inverse cumulative histogram C-1 essentially provides the bin index corresponding to a given cumulative count.

The progressive-histogram reshaping technique embodied in method 30 may correct (e.g., reduce to an imperceptible or unobjectionable level) imbalances in exposure between the first view video content and the second view video content. In general, correcting relatively greater exposure imbalances requires relatively more iterations of loop 36 of method 30. In some embodiments, the number of iterations SMAX of loop 36 is determined based on a measure of exposure imbalance between input video content 32 (e.g., second view video content) and the video content corresponding to target histogram data 34 (e.g., a histogram for first view video content). For example, some embodiments comprise obtaining a measure of exposure imbalance between corresponding frames of different view video content, and determining SMAX based on the measure of exposure imbalance. Since imbalances in exposure may be relatively constant among a sequence of frames, the same determined SMAX may be used for a plurality of sequential frames. In some embodiments, method 10 comprises obtaining a measure of exposure imbalance between first view video content 12 and second view video content 14, and comprises performing progressive-histogram reshaping only when the measure indicates at least a threshold exposure imbalance between first view video content 12 and second view video content 14 (e.g., the number of iterations of the progressive histogram reshaping algorithm is determined to be zero when the measure indicates less than the threshold exposure imbalance).

In some embodiments, a measure of exposure imbalance is obtained by determining an arithmetic mean of pixel intensity, a geometric mean of pixel intensity, or the like. Measures of exposure imbalance may also be obtained from metadata generated by a capture device (such as a camera), an exposure meter deployed during capture, or the like, for example.

Figure 3:
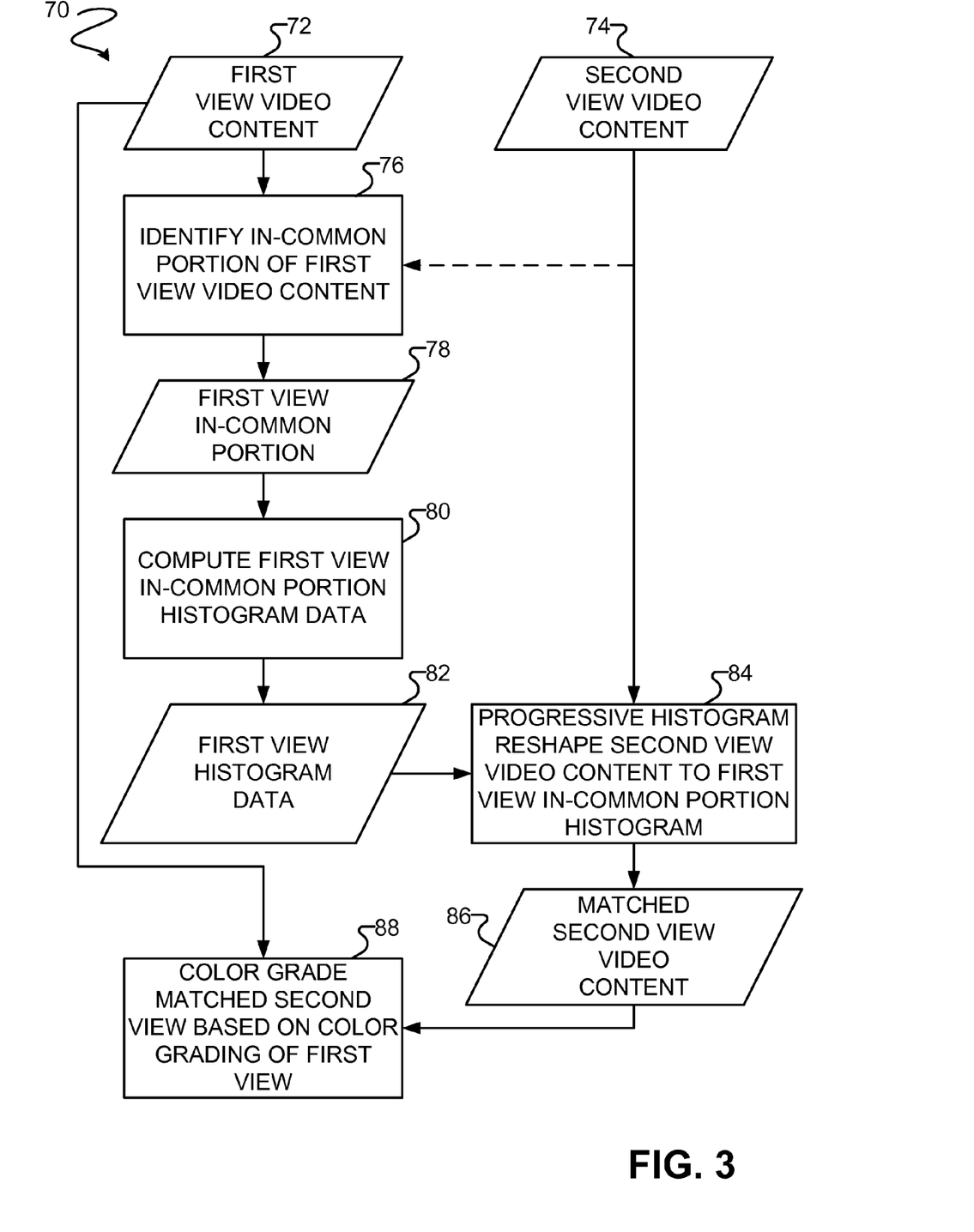
FIG. 3 is a flowchart of a method for color grading multi-view content according to an example embodiment.

FIG. 3 is a flowchart of a method 70 according to an example embodiment. Method 70 differs from method 10 in that in method 70 only a portion of the first view video content in-common with the second view video content is used in the matching of second view video content.

Figure 4A:
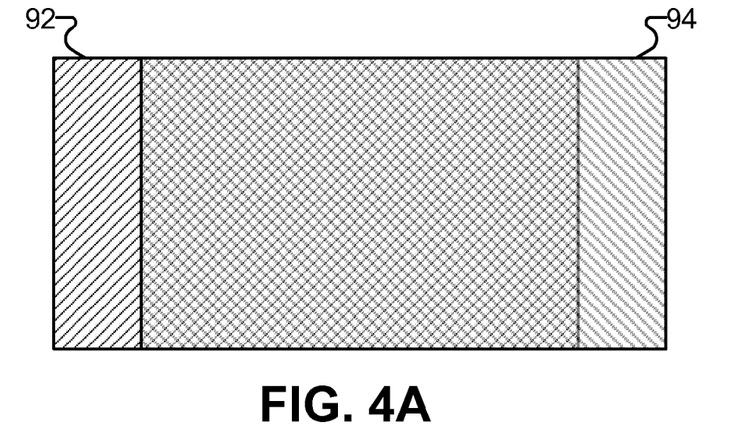
FIG. 4A is a schematic diagram of overlapping fields of view of first and second view video content.

In general, the component views of paired stereoscopic 3D content will have overlapping fields of view. This is illustrated by FIG. 4A, which shows a first field of view 92 of a frame of first view video content overlapping with a second field of view 94 of corresponding frame of second view video content. Step 76 of method 70 comprises identifying a portion 78 of first view video content 72 that is in-common with second view video content 74. In some example embodiments, method 70 identifies a portion 78 of first view video content 72 that is in-common with second view video content 74 for each frame of first view video content 72.

Figure 4B:
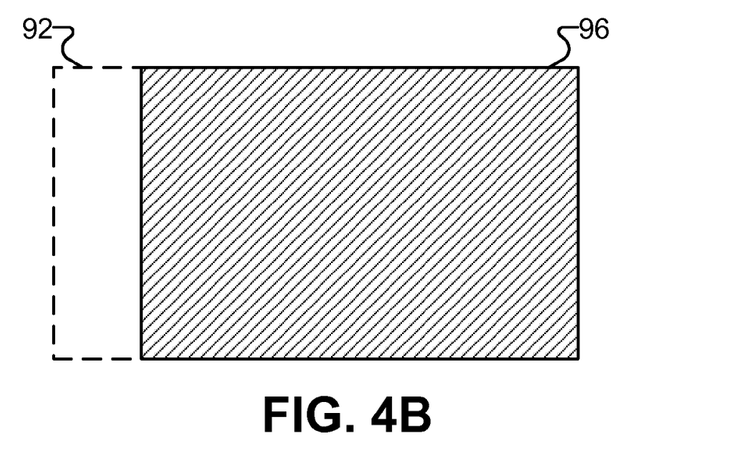
FIG. 4B is a schematic diagram a portion of the field of view of first view video content that overlaps with the field of view of second view video content.

Step 76 may comprise identifying the portion 78 of first view video content 72 corresponding to the portion of the field of view of first view video content 72 that overlaps with the field of view of second view video content 74. This is illustrated schematically in FIG. 4B, which shows the portion 96 of field of view 92 of the first view video content which overlaps with the field of view 94 of the second view video content.

In some embodiments, identifying in-common portion 78 of first view video content 72 comprises obtaining a depth map for first view video content 72 and second view video content 74, identifying portions of first view video content 72 corresponding to features that are not visible in second view video content 72 based at least in part on the depth map, and identifying the complement of these portions as the in-common portion 78 of first view video content 72. For example, where first view video content 72 and second view video content 74 include different views of an object (e.g., a foreground object), different parts of the object will be visible in the different views. Step 78 may comprise identifying the portions first view video content 72 and second view video content 74 corresponding to the parts of the object that are visible in both views.

In some embodiments, identifying in-common portion 78 comprises providing a control for a user to select in-common portion 78, and obtaining a selection of in-common portion 78 entered by the user. For example, a frame of first view video content 72 may be displayed, and a control provided for a cursor usable to select in-common portion 78 on the displayed frame. A control provided for selecting in-common portion 78 may comprise a marquee tool, lasso tool, magic wand tool, vector-based pen tools, and may provide or include facilities such as edge detection, masking, alpha compositing, channel-based extraction, and the like.

In step 80, first view in-common portion histogram data 82 is computed from first view in-common portion 78. In an example embodiment, method 70 computes a set of histograms 82 for each frame of first view video content 72.

Figure 4C:
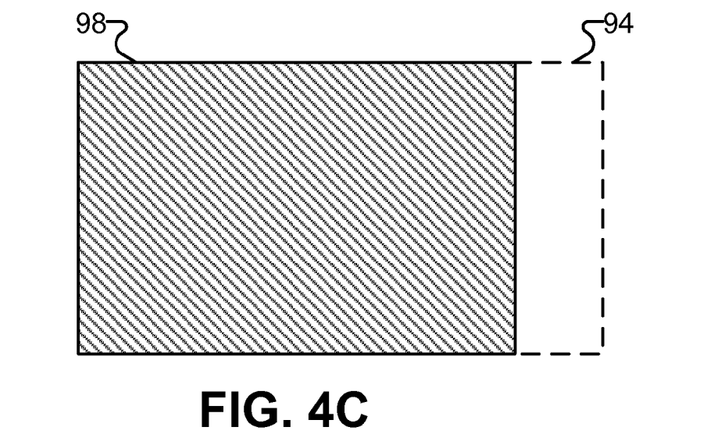
FIG. 4C is a schematic diagram a portion of the field of view of second view video content that overlaps with the field of view of first view video content.

In step 84, second view video content 74 is matched to the in-common portion first view histogram data 82 using a progressive histogram reshaping technique to yield matched second view video content 86. The progressive histogram reshaping technique of method 30 may be used in step 84, for example. In some embodiments, the progressive histogram reshaping performed in step 84 calculates histograms for second view video content 74 using only a portion of second view video content 74 that is in-common with first view video content 72. For example, step 84 may comprise:

identifying a portion of the second view video content 74 that is in-common with first view video content 72 (e.g., portion 98 in FIG. 4C, a portion identified based at least in part on a depth map obtained for first view video content 72 and second view video content 74, etc.);

performing method 30 with that portion of second view video content 74 input to step 52 and first view in-common portion histogram 82 input to step 42; and, after re-shaping the working histogram derived therefrom according to first view in-common portion histogram 82 (e.g., after one or more iterations of loop 36 of FIG. 2), re-mapping pixel values of second view video content 74 in step 68 based on the re-shaped histogram.

In some embodiments, the progressive histogram reshaping performed in step 84 calculates histograms for second view video content 74 using more than just the portion of second view video content 74 that is in-common with first view video content 72 (e.g., histograms may be calculated for all of second view video content 74).

In step 88 of method 70, matched second view video content 86 is automatically color graded based on a color grading of first view video content 72. Step 88 may comprise manually and/or automatically color grading first view video content 72 and automatically applying the same color grading to matched second view video content 86, for example.

Figure 5:
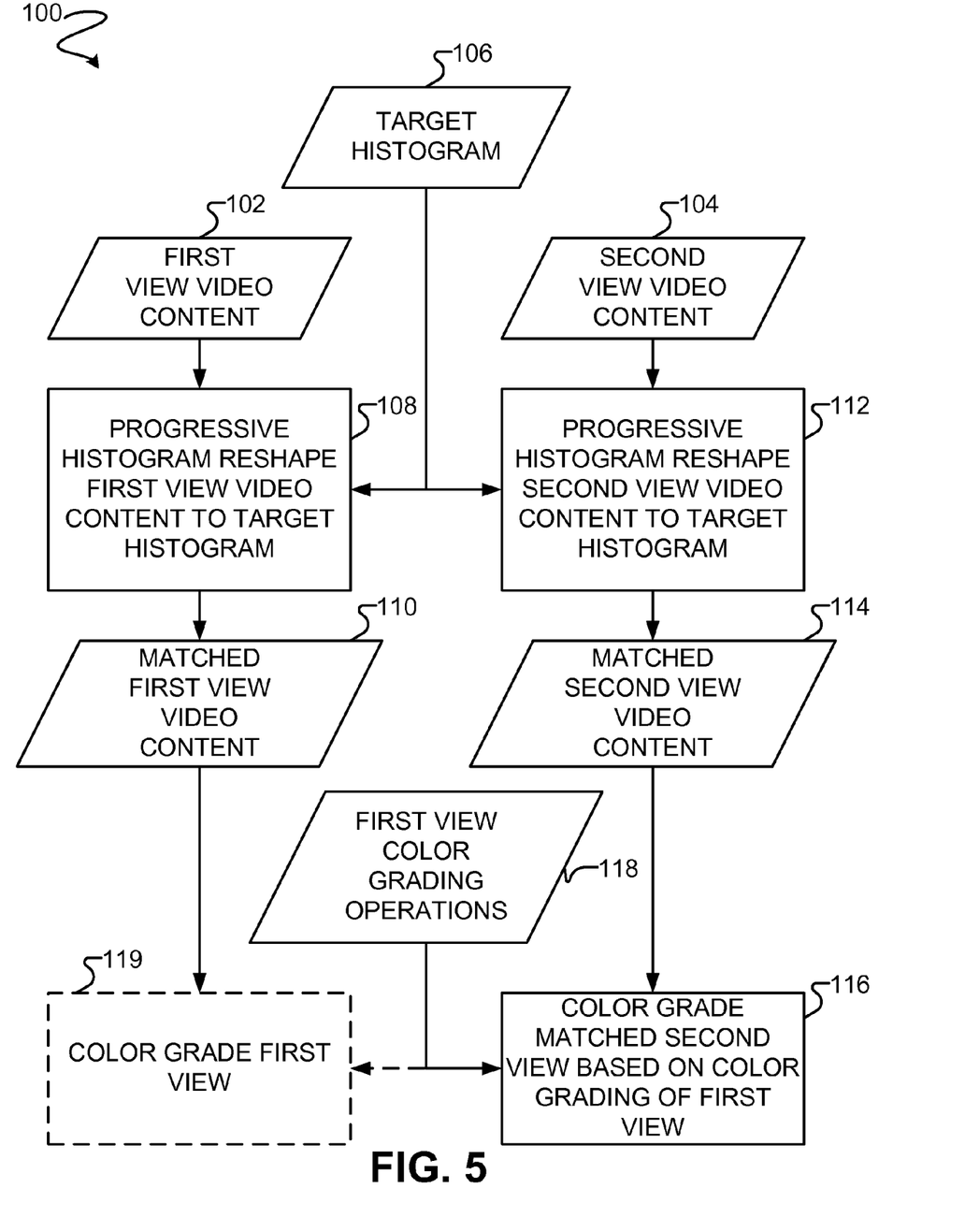
FIG. 5 is a flowchart of a method for color grading multi-view content according to an example embodiment.

FIG. 5 is a flowchart of a method 100 according to an example embodiment. Method 100 differs from method 10 in that in method 100 both first view video content and second view video content are matched to a target, rather than the second view being matched to the first view.

In step 108, first view video content 102 is progressive-histogram matched to a target histogram 106 to yield matched first view video content 110. In step 112, second view video content 104 is progressive-histogram matched to target histogram 106 to yield matched second view video content 114. Steps 108 and 112 may each comprise, for example, method 30.

In step 116, matched second view video content 114 is automatically color graded based on a color grading of matched first view video content 110. For example, in step 116 the color grading operations 118 applied or to be applied to matched first view video content 110 may be applied to matched second view video content 114. The color grading of matched first view video content 110 may be performed in step 116, in another step of method 100 (such as optional step 119), or apart from method 100. Color grading operations 118 may be applied to matched second view video content 110 before, simultaneously with, or after their application to matched first view video content 110.

In some embodiments, the progressive histogram reshaping performed in steps 108 and 112 calculates histograms for video content 102 and 104, respectively, using only the portions of each of video content 102 and 104 that is in-common with the other of video content 102 and 104. For example, step 108 may comprise:

identifying a portion of first view video content 102 that is in-common with second view video content 104, performing method 30 with that in-common portion of first view video content 102 input to step 52 and target histogram 106 input to step 42, and, after re-shaping the working histogram derived therefrom according to target histogram 106 (e.g., after one or more iterations of loop 36), re-mapping pixel values of first view video content 102 in step 68 based on the re-shaped histogram;

and step 110 may comprise:

identifying a portion of second view video content 104 that is in-common with first view video content 102, performing method 30 with that in-common portion of second view video content 104 input to step 52 and target histogram 106 input to step 42, and, after re-shaping the working histogram derived therefrom according to target histogram 106 (e.g., after one or more iterations of loop 36), re-mapping pixel values of second view video content 104 in step 68 based on the re-shaped histogram.

Target histogram 106 may be based on a combination of first view video content 102 and second view video content 104, for example. In some embodiments, method 100 comprises computing target histogram 106 from a combination of first view video content 102 and second view video content 104. For example, target histogram 106 may be computed from a combination of in-common portions of first view video content 102 and second view video content 104. In some embodiments, target histogram 106 is computed for each frame-pair of first view video content 102 and second view video content 104. In an example embodiment, target histogram 106 is computed for a plurality of frame-pairs belonging to the same scene (e.g., all frames belonging to the scene, a sampling of frames belonging to the scene, etc.).

Target histogram 106 may correspond to a color grading objective (e.g., a particular visual aesthetic, a particular range of colors and/or luminances, etc.), for example. In some embodiments, method 100 comprises selecting target histogram 106 from a plurality of histograms corresponding to different color grading objectives. In some embodiments, method 100 comprises computing target histogram 106 from a reference image that is representative of a desired color grading objective. Different target histograms 106 may be used for different sequences of frames corresponding to different scenes depicted in video content 102 and 104.

Where target histogram 106 corresponds to a color grading objective consistent with a color grading objective of color grading performed in step 116, less cost and/or less time may be required to achieve that color grading objective with matched first view video content 110 and/or matched second view video content 114 as compared to first view video content 102 and second view video content 104.

Figure 6:
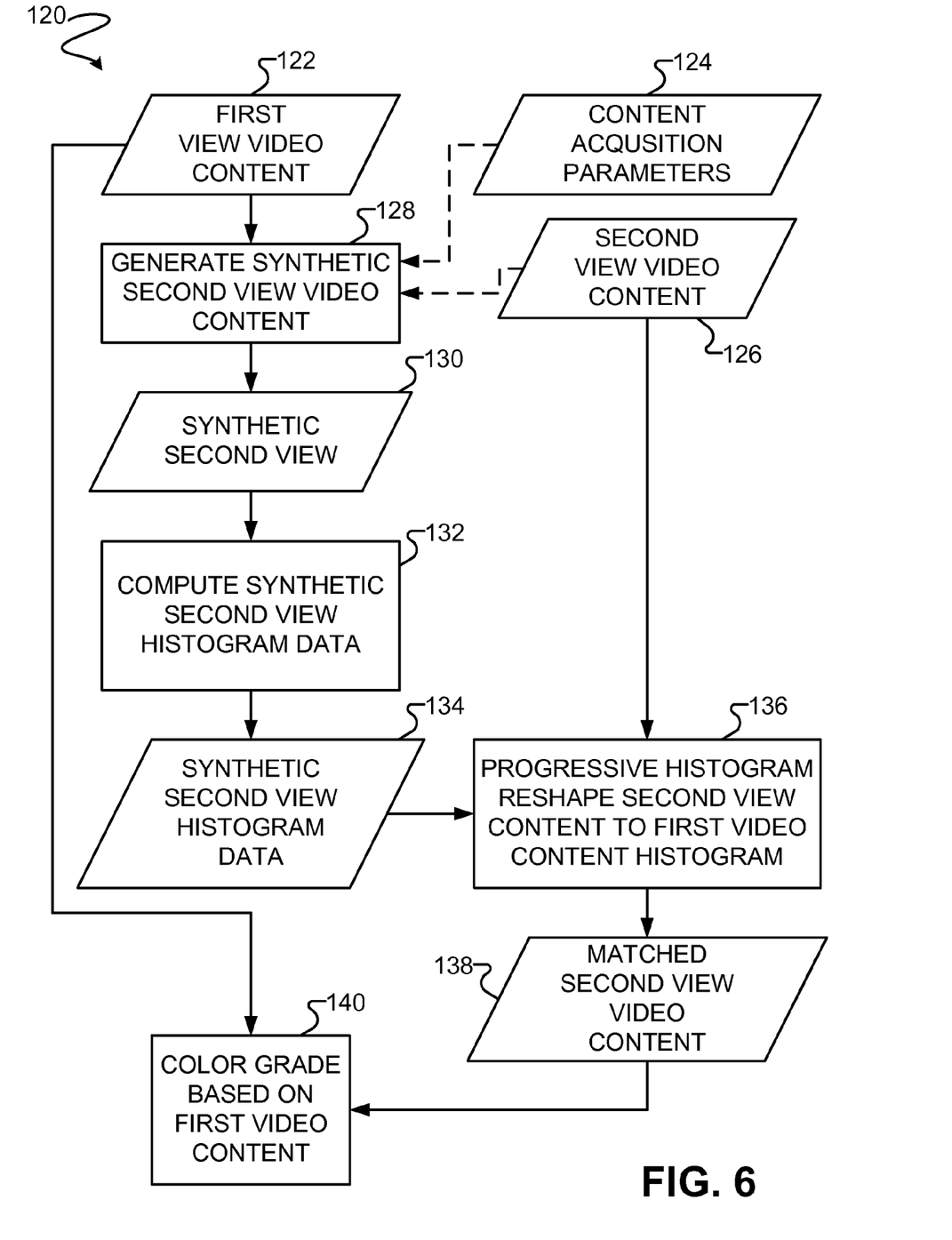
FIG. 6 is a flowchart of a method for color grading multi-view content according to an example embodiment.

FIG. 6 is a flowchart of a method 120 according to an example embodiment. Step 128 comprises generating synthetic second view video content 130 based at least in part on first view video content 122. Synthetic second view video content 130 may be representative of what second view video content 126 would look like if it had been acquired with a camera similar to the one used to acquire first view video content 122 under similar conditions (e.g., exposure) that first view video content 122 was acquired.

Various techniques are known for generating synthetic stereoscopic images. A non-limiting example of a technique that may be used in step 128 to generate synthetic second view video content 130 comprises generating depth maps for frames of first view video content 122 and constructing synthetic second view video content 130 using perspective projection from a synthetic viewpoint corresponding to the viewpoint of second view video content 126 onto the depth map. Content acquisition parameters 124 may include information specifying the field of view of the second view (e.g., relative to the first view), and the like, for example.

In general, it is not be possible to generate a complete synthetic second view based only on image information for the first view. In some embodiments, step 128 comprises determining synthetic second view video content 130 only for portions of the second view that can be determined only from first view video content 122. Where this is done, synthetic second view video content 130 may not be defined for portions of the second view that cannot be determined only from first view video content 122.

In step 132, synthetic second view histogram data 134 is calculated from second synthetic view video content 130. In an example embodiment, method 120 computes synthetic second view histogram data 134 comprising a set of histograms for each frame of synthetic second view video content 130.

In step 136, second view video content 126 is matched to the second synthetic view histogram data 134 using a progressive histogram reshaping technique to yield matched second view video content 138. The progressive histogram reshaping technique of method 30 may be used in step 136, for example. In step 140, matched second view video content 138 is automatically color graded based on a color grading of first view video content 122. Step 140 may comprise color grading first view video content 122 and applying the same color grading to matched second view video content 138, for example.

In embodiments where synthetic second view video content 130 is not defined for portions of the second view that cannot be determined only from first view video content 122, the progressive histogram reshaping performed in step 138 may calculate histograms for second view video content 124 using only a portion of second view video content 126 that is in-common with synthetic view video content 130. For example, step 138 may comprise identifying a portion of the second view video content 126 that is in-common with synthetic second view video content 130, performing method 30 with that portion of second view video content 126 input to step 52 and synthetic second view histogram 134 input to step 42, and, after re-shaping the working histogram derived therefrom according to synthetic second view histogram 134 (e.g., after one or more iterations of loop 36), re-mapping pixel values of second view video content 126 in step 68 based on the re-shaped histogram.

Figure 7:
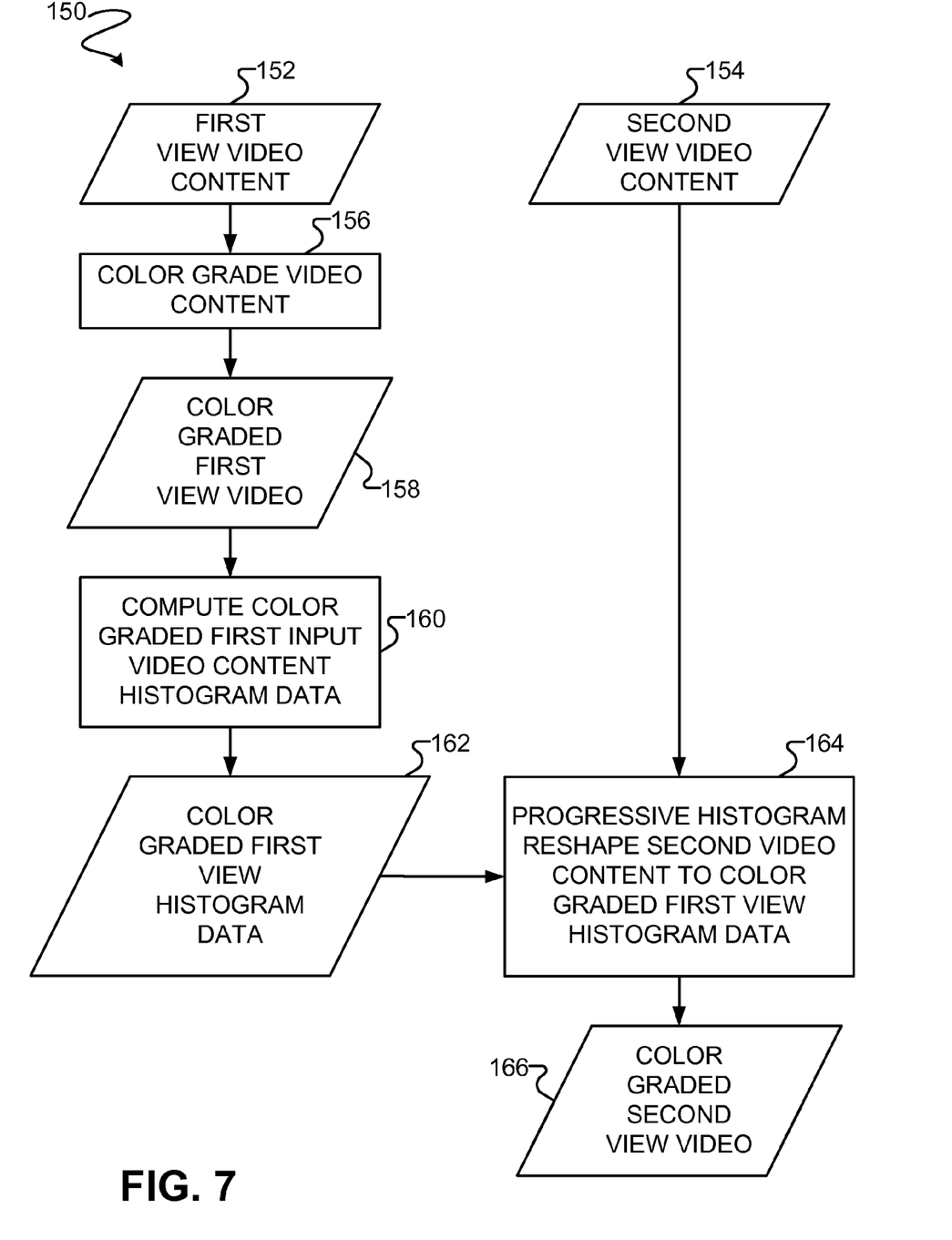
FIG. 7 is a flowchart of a method for color grading multi-view content according to an example embodiment.

FIG. 7 is a flowchart of a method 150 according to an example embodiment. In step 156, first view video content 152 is color graded to yield color graded first view video content 158. In step 160, color graded first view histogram data 162 is computed from color graded first view video content 158. In an example embodiment, method 150 computes first view histogram data 162 comprising a set of histograms for each frame of color graded first view video content 158. In step 164, second view video content 154 is progressive-histogram matched to color graded first view histogram data to yield color graded second view video content 166.

Method 150 may comprise a step of identifying a portion of color graded first view video content 158 that is in-common with second view video content 154. In embodiments where method 150 comprises such a step, step 164 may comprise matching second view video content 154 to a histogram computed for the in-common portion of color graded first view video content 158. In some embodiments, the progressive histogram reshaping performed in step 164 computes histograms for second view video content 154 using only a portion of second view video content 154 that is in-common with color graded first view video content 158. For example, step 164 may comprise:

identifying a portion of the second view video content 154 that is in-common with color graded first view video content 158;

performing method 30 with that in-common portion of second view video content 154 input to step 52 and a color graded first view in-common portion histogram input to step 42; and after re-shaping the working histogram derived therefrom according to the color graded first view in-common portion histogram (e.g., after one or more iterations of loop 36), re-mapping pixel values of second view video content 154 in step 68 based on the re-shaped histogram.

Techniques other that progressive-histogram reshaping may be used in embodiments to make the color and/or luminance characteristics of input video content (e.g., second view video content) more similar to color and/or luminance characteristics of target video content (e.g., first view video content, color and/or luminance characteristics embodied in a target histogram, etc.). Alternative color and/or luminance characteristic conforming techniques that may be used in methods described herein (e.g., as an alternative to progressive histogram reshaping in steps 20, 84, 108, 112, 136, and 164) include tone-mappings configured to make one or more image statistics of a input video content more similar to corresponding image statistics of target video content.

In some embodiments, second view video content may be tone-mapped to shift the geometric mean of luminance toward the geometric mean of luminance of first view video content. Such tone-mapping may comprise scaling pixel values of the second view video content by a factor and/or adding an offset to pixels values of the second view video content, for example. The scaling factor and/or offset may be determined based on the geometric means of luminance of the first view video content and the second view video content.

In some embodiments, second view video content may be tone-mapped using a parameterized function, such as sigmoid curve, for example. For example a sigmoid curve given by the following equation may be used to map between input and output values:

where c1, c2, and c3 are parameters, Lin is the input luminance value, Lout is the output luminance value, and n is a parameter that determines the local contrast in the target image. The values for parameters c1, c2, and c3 may be determined based on luminance characteristics of the input video content and the target video content. For instance, where luminance of the input video content is characterised by three values x1, corresponding to the minimum luminance value, x2, corresponding to an intermediate (e.g., mean, median or the like) luminance value, and x3, corresponding to the maximum luminance value, and where luminance of the target video content is characterised by three values y1, corresponding to the minimum luminance value, y2, corresponding to an intermediate (e.g., mean, median or the like) luminance value, and y3, corresponding to the maximum luminance value, then values for parameters c1, c2, and c3, may be derived from the following formula:

In embodiments where second view video content is tone-mapped to more closely resemble first view video content using equation (3), values for x1 and x3 may be determined from luminance statistics of first view video content. For example, x1 may be determined as the 5th percentile luminance of first view video content and x3 may be determined as the 95th percentile luminance of first view video content.

One feature of the transfer function in equation (3) above is that n remains a free parameter. This permits the mid-tone contrast to be set to any desired level. It should be noted that the log-log slope at the mid-tone anchor point will differ slightly from the value of n if the mid-tone anchor point is not centered in the input and output ranges. However, the mid-tone contrast can be set by adjusting the value for n. A good starting point for the mid-tone contrast parameter, n, is 1. This value for n ensures that the mapped content has substantially similar mid-range local contrast to the target content.

Other luminance characteristic conforming techniques that may be used in methods described herein (e.g., as an alternative to progressive histogram reshaping in steps 20, 84, 108, 112, 136, and 164) may also be suitable. In one non-limiting example technique, local or global adjustments are determined and applied to video content for a view to minimize the differences between the video content and video content for a reference view. Differences may be computed with peak signal to noise ratio (PSNR), for example. Adjustments may be applied to luminance and/or chroma channels of the image.

As described above for progressive-histogram reshaping, parameters of alternative color and/or luminance conforming techniques may determined from in-common portions of input video content and target video content. For example, the parameters c1, c2, and c3 may be based on values x1, x2, x3, y1, y2, and y3 determined from in-common portions of input video content and target video content, respectively. For another example, geometric means of luminance for input video content and target video content may be determined from in-common portions of the input video content and the target video content, respectively.

Figure 8:
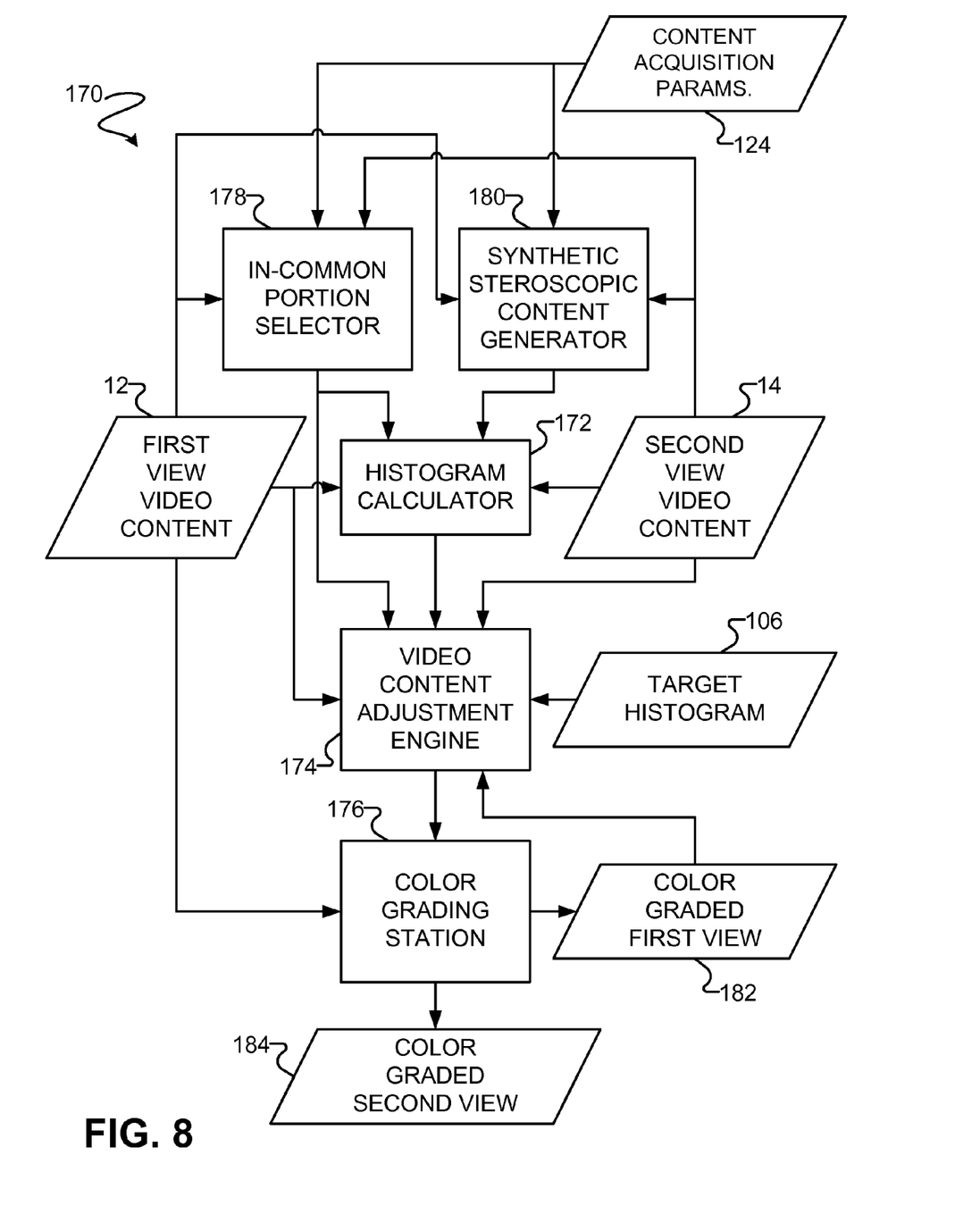
FIG. 8 is a system for color grading multi-view content according to an example embodiment.

FIG. 8 is a schematic diagram of a color grading system 170 according to an example embodiment. System 170 comprises a histogram calculator 172, a video content adjustment engine 174 and a color grading station 176. In some embodiments, video content adjustment engine 174 comprises a progressive histogram reshaping engine. In some embodiments, histogram calculator 172 and video content adjustment engine 174 are combined. In some embodiments, system 160 comprises one or both of optional in-common portion selector 178 and synthetic stereoscopic content generator 180.

Components of system 170 may comprise hardware, software, firmware or any combination thereof. For example, system 170 may be implemented on a programmed computer system comprising one or more processors, user input apparatus, displays and the like. Processors may comprise microprocessors, digital signal processors, graphics processors, field programmable gate arrays, and/or the like. Components of system 170 may be combined or subdivided, and components of system 170 may comprise sub-components shared with other components of system 170.

System 170 and the components thereof may be configured to perform all of part of one or more of methods 10, 30, 70, 100, 120 and 150, as well as combinations, subcombinations, and variants thereof. For example:

histogram calculator 172 may be configured to perform one or more of steps 16, 80, 132, 160 and the like;

video content adjustment engine 174 may be configured to perform one or more of steps 20, 84, 108, 112, 136, 164 and the like, as well as alternative video data matching techniques;

color grading station 176 may be configured to perform one or more of steps 24, 88, 16, 140, 156 and the like;

in-common portion selector 178 may be configured to perform step 76, other portion selection operations described herein, and/or the like; and synthetic stereoscopic content generator 180 may be configured to perform step 180 and/or the like.

The arrows in FIG. 170 show examples of where various inputs to methods 10, 30, 70, 100, 120 and 150 may be directed to histogram calculator 172, video content adjustment engine 174, in-common portion selector 178 and/or synthetic stereoscopic content generator 180. Though only first view video content 12 and second view video content 14 are shown in FIG. 8, it will be understood that any of first view video content 12, 72, 102, 122 and 152, and any of second view video content 14, 74, 104, 124 and 154 may be input to system 170 in the performance to methods 30, 70, 100, 120 and 150 using system 170. In some embodiments, system 170 comprises a tone-mapping engine (not shown in FIG. 8).

Where a component (e.g. a histogram calculator, video content adjustment engine, progressive histogram reshaping engine, color grading station, in-common portion selector, synthetic stereoscopic content generator, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Aspects of the invention may be provided in the form of a program product. The program product may comprise any non-transitory medium which carries a set of computer-readable information comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable information on the program product may optionally be compressed or encrypted.

Those skilled in the art will appreciate that certain features of embodiments described herein may be used in combination with features of other embodiments described herein, and that embodiments described herein may be practised or implemented without all of the features ascribed to them herein. Such variations on described embodiments that would be apparent to the skilled addressee, including variations comprising mixing and matching of features from different embodiments, are within the scope of this invention.

It will be appreciated that the invention may be embodied in a wide variety of embodiments. For example, embodiments of the invention may comprise:

methods of color grading stereoscopic content;
apparatus for color grading stereoscopic content;
methods of color grading multi-view (or autosteroscopic) content (e.g., methods providing color grading of second and third views based on color grading of a first view);
apparatus for color grading multi-view (or autosteroscopic) content (e.g., apparatus configured to color grade second and third view based on color grading of a first view);
computer media carrying instructions that when executed cause computers to perform methods for color grading;
computer media carrying instructions to perform color grading methods;
etc.

While a number of exemplary aspects and embodiments have been discussed above, those of skill in the art will recognize certain modifications, permutations, additions and sub-combinations thereof. For example:

Color grading of first view and second view video content need not be performed at the same time or on the same apparatus. In some embodiments, a record of color grading operations applied in color grading first view video content is used to replicate the same color grading operations on matched second view video content subsequent to the color grading of the first view video content.

Embodiments may be adapted for use with content corresponding to more than two views.

Embodiments may generate a plurality of versions of matched video content (e.g., versions of matched second view video content), the versions differing in their degree of similarity to target histogram data (e.g., histogram data for first view video content), color grade each of the versions of matched video content based on a color grading of the video content corresponding to the target histogram data (e.g., first view video content), display each of the color-graded matched video content versions, and provide a control for a user to select one of the color-graded matched video content versions (e.g., for distribution with a color-graded version of video content corresponding to the target histogram data). For example, the plurality of versions of matched video content could correspond to mappings of the original content (e.g., second view video content) for working histogram data yielded by different numbers of iterations of a progressive histogram matching algorithm. In some embodiments, at least one of the versions of color-graded matched content is displayed simultaneously with a color-graded version of the video content corresponding to the target histogram data.

In embodiments where two or more views of multi-view video content is color graded based on a color grading of another view of the multi-view content, matched versions of the two or more views may differ in their degree of similarity to a histogram corresponding to the other view.

In some embodiments, a target histogram may be computed from two or more views of multi-view video content, and at least one other view of the multi-view video content matched to the histogram. The matched other view video content may be color graded based on the color grading of either, a combination, or all of the two or more views.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for color grading second view video content based on a color grading of first view video content, the method comprising:
   obtaining target histogram data;
   obtaining second histogram data for the second view video content;
   adjusting the second view video content so that a histogram of the adjusted second view video content is more closely similar to the target histogram data; and
   automatically color grading the adjusted second view video content based on a color grading of the first view video content.

2. The method of claim 1 wherein the target histogram data comprises histogram data for the first view video content.

3. The method of claim 1 comprising:
   generating a first mapping from the second view video content to the adjusted second view video content by performing a first number of iterations of a progressive histogram reshaping algorithm configured to progressively match histogram data for the second view video content to the target histogram data; and
   applying the first mapping to generate the adjusted second view video content from the second view video content.

4. The method of claim 3 comprising:
   obtaining a measure of exposure imbalance between the first view video content and the second view video content; and
   determining the first number of iterations is based on the measure of exposure imbalance.

5. The method of claim 4 wherein obtaining the measure of exposure imbalance comprises automatically determining a measure of exposure imbalance between the first view video content and the second view video content.

6. The method of claim 4 comprising determining the first number of iterations to be zero when the measure of exposure imbalance indicates less than a threshold exposure imbalance.

7. The method of claim 1 wherein automatically color grading the adjusted second view video content comprises applying a plurality of color grading operations based on a corresponding plurality of color grading operations applied in the color grading of the first view video content.

8. The method of claim 1 comprising:
   obtaining an identification of an in-common portion of the first view video content that is common between the first view video content and the second view video content, wherein obtaining the target histogram data comprises calculating the target histogram data based on the in-common portion of the first view video content.

9. The method of claim 8 wherein the in-common portion of the first view video content corresponds to an overlap of a field of view of the first view video content with a field of view of the second view video content.

10. The method of claim 8 wherein identifying the in-common portion of the first view video content comprises obtaining a depth map for the first view video content and the second view video content, identifying a portion of the first view video content that is not included in the second view video content based at least in part on the depth map, and identifying the complement of the non-included as the in-common portion of the first view video content.

11. The method of claim 1 wherein obtaining the target histogram data comprises calculating the target histogram data based on a combination of at least a portion of the first view video content and at least a portion of the second view video content.

12. The method of claim 11 wherein obtaining the target histogram data comprises calculating the target histogram data based on a combination of mutually in-common portions of the first view video content and the second view video content.

13. The method of claim 1 wherein obtaining the target histogram data comprises selecting the target histogram data based on a color grading objective.

14. The method of claim 13 wherein selecting the target histogram data based on a color grading objective comprises selecting an image corresponding to the color grading objective and computing histogram data for the selected image.

15. The method of claim 1 comprising:
generating synthetic second view video content based at least in part on the first view video content,
wherein the target histogram data comprises histogram data for the synthetic second view video content.

16. The method of claim 1 comprising:
adjusting the first view video content so that a histogram of the adjusted first view video content is more closely similar to the target histogram data,
wherein the color grading of the first view video content comprises a color grading of the adjusted first view video content.

17. The method of claim 16 comprising:
generating a second mapping from the first view video content to adjusted first view video content by performing a second number of iterations of a progressive histogram reshaping algorithm configured to progressively match histogram data for the first view video content to the target histogram data; and
applying the second mapping to generate the adjusted first view video content from the first view video content.

18. The method of claim 1 comprising:
obtaining a measure of exposure imbalance between the first view video content and the second view video content; and
wherein the adjustment of the second view video content is based at least in part on the measure of exposure imbalance.

19. The method of claim 18 wherein obtaining the measure of exposure imbalance comprises automatically determining a measure of exposure imbalance between the first view video content and the second view video content.

20. The method of claim 1 wherein adjusting the second view video content so that a histogram of the adjusted second view video content is more closely similar to the target histogram data comprises tone mapping the second view video content to the adjusted second view video content,
wherein the target histogram data comprises a luminance histogram, and
wherein the tone mapping is configured to shift the geometric mean of luminance toward the geometric mean of luminance specified by the target histogram data.

21. Apparatus for color grading second view video content based on a color grading of first view video content, the apparatus comprising:
a histogram calculator configured to obtain second histogram data for the second view video content;
a video content adjustment engine configured to adjust the second view video content so that a histogram of the adjusted second view video content is more closely similar to target histogram data; and
a color grading station configured to automatically color grade the adjusted second view video content based on a color grading of the first view video content.

22. The apparatus of claim 21 wherein the target histogram data comprises histogram data for the first view video content.

23. The apparatus of claim 21 wherein the video content adjustment engine comprises a progressive histogram matching engine configured to:
generate a first mapping from the second view video content to the adjusted second view video content by performing a first number of iterations of a progressive histogram reshaping algorithm configured to progressively match histogram data for the second view video content to the target histogram data, and
apply the first mapping to generate the adjusted second view video content from the second view video content.

24. The apparatus of claim 23 wherein the number of first iterations performed by the video content adjustment engine is based on a measure of exposure imbalance between the first view video content and the second view video content.

25. The apparatus of claim 21 wherein the color grading station is configured to apply a plurality of color grading operations based on a corresponding plurality of color grading operations applied in the color grading of the first view video content.

26. The apparatus of claim 21 comprising an in-common portion selector configured to obtain an identification of an in-common portion of the first view video content that is common between the first view video content and the second view video content,
and wherein the histogram calculator is configured to calculate the target histogram data based on the in-common portion of the first view video content.

27. The apparatus of claim 26 wherein the in-common portion of the first view video content corresponds to an overlap of a field of view of the first view video content with a field of view of the second view video content.

28. The apparatus of claim 26 wherein the in-common portion selector is configured to obtain a depth map for the first view video content and the second view video content, identify a portion of the first view video content that is not included in the second view video content based at least in part on the depth map, and identify the complement of the non-included as the in-common portion of the first view video content.

29. The apparatus of claim 21 wherein the histogram calculator is configured to calculate the target histogram data based on a combination of at least a portion of the first view video content and at least a portion of the second view video content.

30. The apparatus of claim 29 wherein the histogram calculator is configured to calculate the target histogram data based on a combination of mutually in-common portions of the first view video content and the second view video content.

31. The apparatus of claim 21 comprising a user interface, the user interface configured to receive a user specification of the target histogram data.

32. The apparatus of claim 31 wherein the user interface is configured to display a plurality of images, to receive a user selection of one of the plurality of images, and to obtain target histogram data based on the selected image.

33. The apparatus of claim 21 comprising a synthetic stereoscopic content generator configured to generate synthetic second view video content based at least in part on the first view video content, wherein the histogram calculator is configured to calculate the target histogram data based on the synthetic second view video content.

34. The apparatus of claim 21 wherein the video content adjustment engine is configured to adjust the first view video content so that a histogram of the adjusted first view video content is more closely similar to the target histogram data.

35. The apparatus of claim 34 wherein the video content adjustment engine is configured to:
generate a second mapping from the first view video content to adjusted first view video content by performing a second number of iterations of a progressive histogram reshaping algorithm configured to progressively match histogram data for the first view video content to the target histogram data, and
apply the second mapping to generate the adjusted first view video content from the first view video content.

36. The apparatus of claim 21 wherein the video content adjustment engine is configured to adjust the second view video data based at least in part on a measure of exposure imbalance between the first view video content and the second view video content.

37. A method for color grading first view video content and second view video content, the method comprising:
obtaining target histogram data for the first view video content;
obtaining second histogram data for the second view video content;
adjusting the second view video content so that a histogram of the adjusted second view video content is more closely similar to the target histogram data; and
applying a set of color grading operations to the first view video content and the matched second view video content.

38. The method of claim 37 wherein the set of color grading operations is determined without reference to either of the second view video content or the matched second view video content.

39. The method of claim 37 wherein the set of color grading operations is determined based at least in part on the first view video content.

40. The method of claim 37 comprising:
generating a first mapping from the second view video content to the adjusted second view video content by performing a first number of iterations of a progressive histogram reshaping algorithm configured to progressively match histogram data for the second view video content to the target histogram data; and
applying the first mapping to generate the adjusted second view video content from the second view video content.

41. A non-transitory medium comprising a computer program product for color grading first view video content and second view video content, the computer program product having code that when executed by a processor:
obtains target histogram data;
obtains second histogram data for the second view video content;
adjusts the second view video content so that a histogram of the adjusted second view video content is more closely similar to the target histogram data; and
automatically color grades the adjusted second view video content based on a color grading of the first view video content.

42. A non-transitory medium comprising a computer program product for color grading first view video content and second view video content, the computer program product having code that when executed by a processor:
obtains target histogram data;
obtains second histogram data for the second view video content;
adjusts the second view video content so that a histogram of the adjusted second view video content is more closely similar to the target histogram data; and
applies a set of color grading operations to the first view video content and the matched second view video content.

* * * * *